United States Patent [19]

Ohkumo

[11] Patent Number: 4,880,094
[45] Date of Patent: Nov. 14, 1989

[54] CONTROL SYSTEM FOR A CLUTCH FOR A VEHICLE

[75] Inventor: Hiroya Ohkumo, Koganei, Japan

[73] Assignee: Fuji Jukogyo Kabushiki Kaisha, Tokyo, Japan

[21] Appl. No.: 145,347

[22] Filed: Jan. 19, 1988

[30] Foreign Application Priority Data

Jan. 23, 1987 [JP] Japan .................................. 62-13767

[51] Int. Cl.$^4$ ...................... B60K 41/28; F16D 37/02
[52] U.S. Cl. .............................. 192/0.052; 192/0.076; 192/3.56; 192/21.5; 192/103 R
[58] Field of Search .................. 192/3.56, 21.5, 103 R, 192/0.052, 0.076

[56] References Cited

U.S. PATENT DOCUMENTS 4,457,411 7/1984 Hiramatsu .......................... 192/3.56
4,558,772 12/1985 Grimes et al. .................. 192/103 R
4,623,052 11/1986 Watanabe et al. ................. 192/21.5
4,660,697 4/1987 Yoneda et al. ................... 192/103 R

FOREIGN PATENT DOCUMENTS 0151038 8/1985 European Pat. Off. .
151043 8/1985 European Pat. Off. ........... 192/3.56

Primary Examiner—Dwight G. Diehl
Assistant Examiner—David A. Testardi
Attorney, Agent, or Firm—Martin A. Farber

[57] ABSTRACT

A system for controlling an electromagnetic clutch for a motor vehicle at transient state of driving condition of the motor vehicle. An actual engagement ratio is obtained in dependence on speeds of a drive member land a driven member of the clutch. A desired engagement ratio of the clutch is obtained in accordance with the speeds of the drive member and driven member. Clutch current is controlled so as to converge the actual engagement ratio on the desired engagement ratio. The transition of the change of the actual engagement ratio is observed and a correction signal is generated when the actual engagement ratio does not change in a converging direction. The clutch current is corrected by the correction signal.

4 Claims, 8 Drawing Sheets

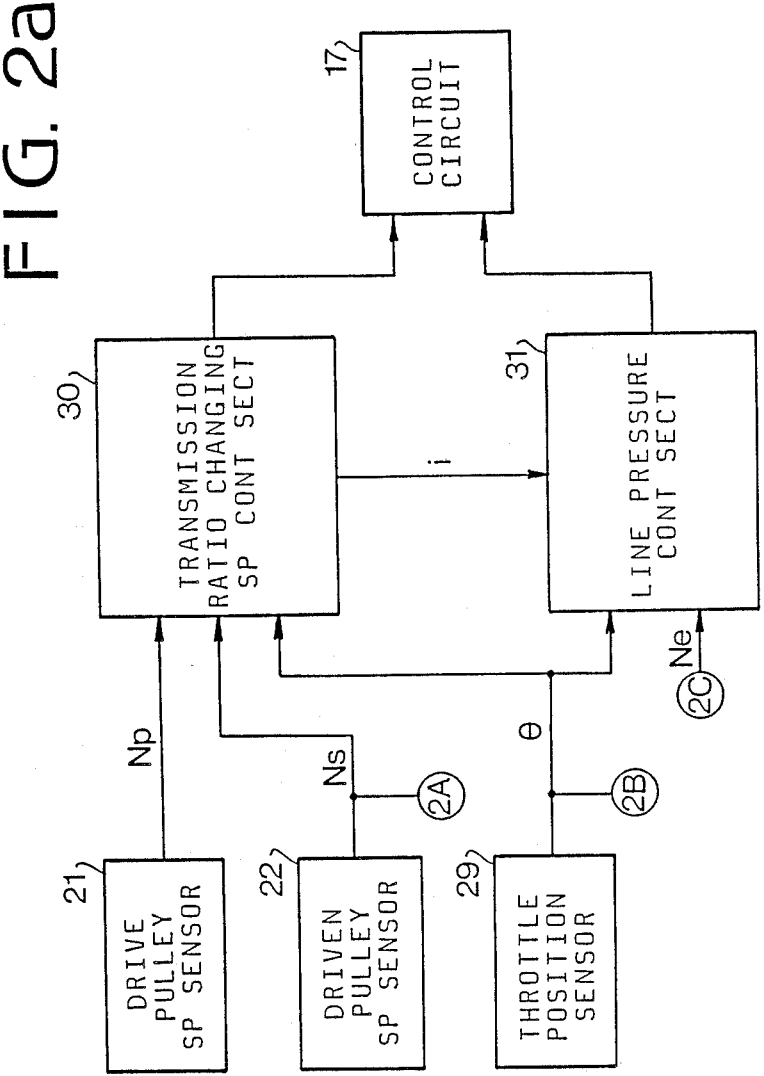

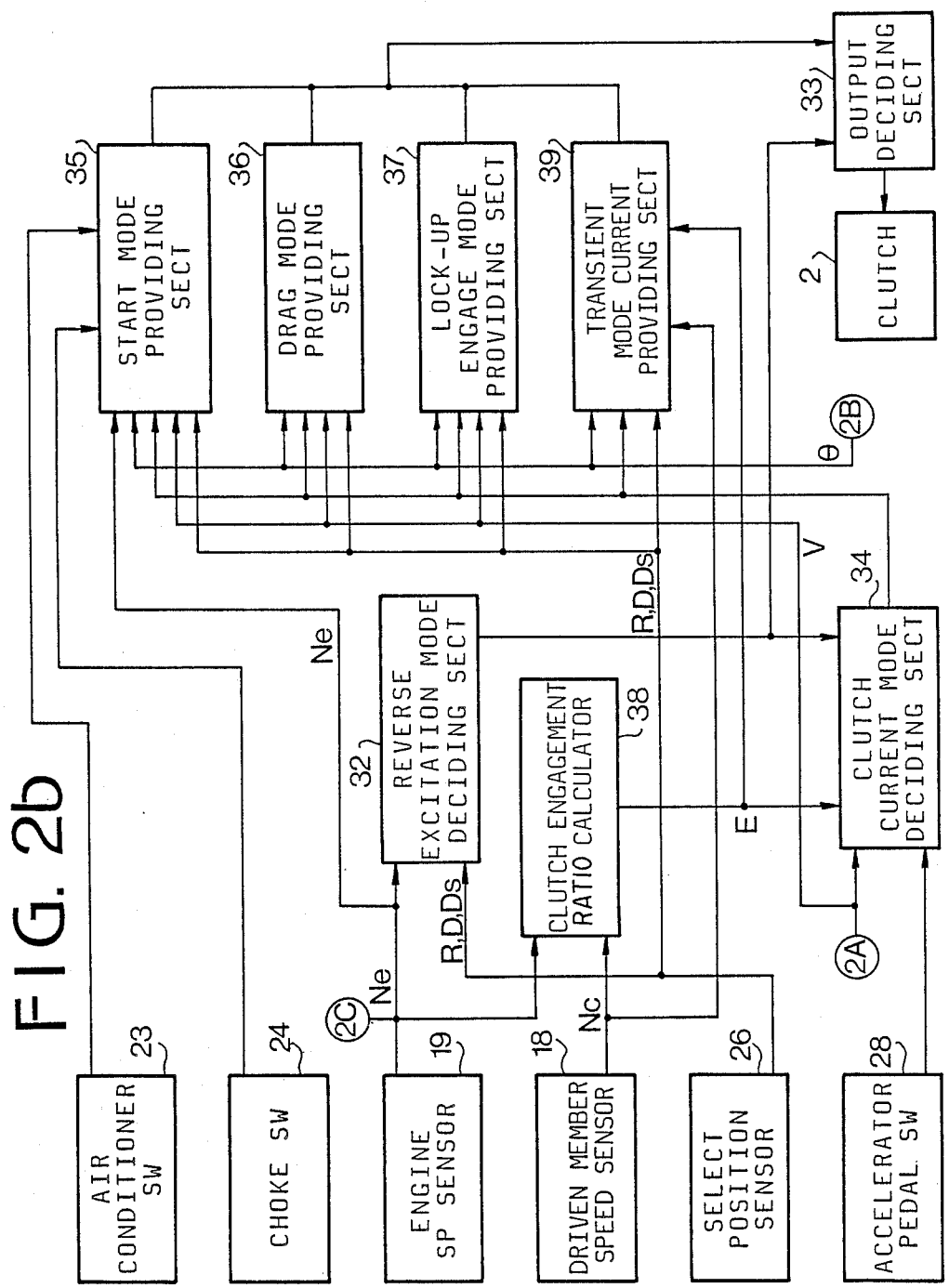

CONTROL SYSTEM FOR A CLUTCH FOR A VEHICLE

BACKGROUND OF THE INVENTION

The present invention relates to a control system for an electromagnetic clutch for an automatic transmission of a motor vehicle.

An automobile provided with a continuously variable belt-drive transmission with an electromagnetic clutch is disclosed in EP-A 151038. The electromagnetic clutch of the transmission is controlled by a control system to provide various operational modes as steady state modes, such as a starting mode of a vehicle, reverse excitation mode, drag mode, mode of lock-up engagement. One of the modes is selected in accordance with a position of a selector lever and driving conditions to control the electromagnetic clutch.

Other prior art discloses control systems which provide transient state modes for various transient states. The transient states include states at the changing of ranges, for example changes from a neutral range (N-range) or parking range (P-range) to drive range (D-range), high engine speed drive range (Ds-range) or reverse range (R-range), from the D-range to Ds-range, and at the changing of modes, for example changes from the starting mode to the lock-up engage mode. Further, the transient state mode includes operations such as releasing and depressing of an accelerator pedal in starting or lock-up engage mode. In the transient state mode, clutch torque is temporarily decreased to cause the clutch to slip so as to prevent a shock at the changing operation. The clutch torque is gradually raised thereafter. In another device, the clutch torque is varied with time in accordance with a particular characteristic.

In order to appropriately control clutch slipping characteristic, controlling of the clutch engagement ratio is proposed. In the control, desired clutch engagement ratio Eo is set and actual clutch engagement rate E is obtained. The clutch torque is increased or decreased in proportion to the difference between both the desired ratio and the actual ratio (Eo-E) to converge the actual ratio to the desired ratio. However, in the transient state mode, rapid response to variations of engine torque and torque-load is required. Since hunting or overshooting of the engagement ratio control causes the driveability of the vehicle to reduce, it is important to improve the convergency.

SUMMARY OF THE INVENTION

The object of the present invention is to provide a control system for a clutch where the clutch torque is controlled at rapid response and high convergency. According to the present invention, there is provided system for controlling a clutch for a motor vehicle comprising first detector means for detecting a transient state of driving condition of the motor vehicle and for producing a transient state signal, first means responsive to the transient signal for detecting speed of a drive member of the clutch and speed of a driven member of the clutch, second means for producing an actual engagement ratio dependent on the speeds of the drive and driven members, third means for providing a desired engagement ratio of the clutch, fourth means for controlling clutch torque based on difference between the actual engagement ratio and the desired engagement ratio to control the clutch torque so as to converge the actual engagement ratio on the desired engagement ratio; second detector means for detecting the transition of the change of the actual engagement ratio and for producing a correction signal when the actual engagement does not change in accordance with said difference; and fifth means responsive to the correction signal for correcting the clutch torque to perform the convergence.

The other objects and features of this invention will become understood from the following description with reference to the accompanying drawings.

BRIEF DESCRIPTION OF DRAWINGS

FIGS. 2a and 2b show a block diagram of a control unit according to the present invention;

DETAILED DESCRIPTION OF THE PREFERRED EMBODIMENT

Figure 1:
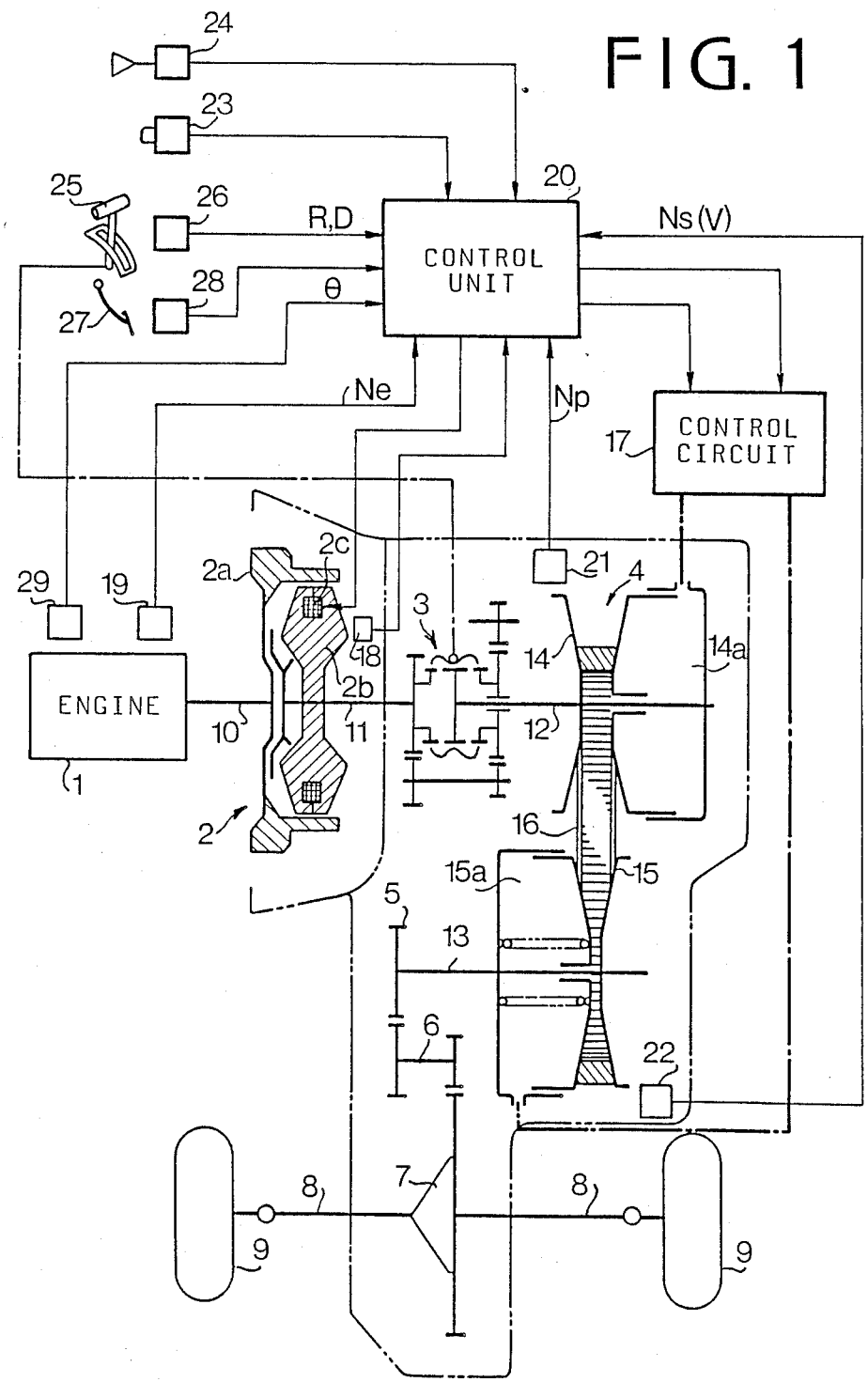
FIG. 1 is a schematic illustration of a control system for an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive automatic transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Powder of magnetic material is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive automatic transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D-range), high engine speed driving position (Ds-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces of cylinders so that the running diameter of belt 16 is varied to infinitely change the transmission ratio.

An electronic control system for the clutch 2 and the belt-drive automatic transmission 4 has an engine speed sensor 19, and rotating speed sensors 21 and 22 for respectively sensing speeds of drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing the drive positions D and $D_S$ and the reverse position R. An accelerator pedal switch 28 is provided for sensing the depression of an accelerator pedal 27, and a throttle position sensor 29 is provided. A driven member speed sensor 18 for sensing the speed of the driven member 2b of the clutch 2 is further provided.

Output signals of the sensors and pulses of the switches are applied to an electronic control unit 20 which produces a clutch current control signal to the clutch 2 and a control signal for controlling the transmission ratio (i) and a line pressure control signal to the control circuit 17.

Referring to FIGS. 2a and 2b showing the control unit 20 of FIG. 1, a transmission ratio changing speed control section 30 is applied with a drive pulley speed signal $N_P$ of the sensor 21, driven pulley speed signal $N_S$ of the sensor 22, and throttle position signal $\theta$ of the sensor 29 to produce the transmission ratio control signal dependent on a transmission ratio changing speed (rate) di/dt. A line pressure control section 31 is applied with an engine speed signal Ne of the sensor 19, throttle position signal $\theta$ of the sensor 29, actual transmission speed ratio signal i ($N_S/N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with engine speed signal Ne of the sensor 19 and drive position signals of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of starting characteristic dependent on the engine speed Ne at ordinary start or at closing of the choke switch 24 or air conditioner switch 23. The starting characteristic is corrected by signals from the throttle valve opening degree $\theta$, vehicle speed V, and driving positions of D-range, $D_s$-range and R-range.

The drag mode providing section 36 decides a small drag current when the accelerator pedal 27 is released at a low speed in each drive position for providing a drag torque to the clutch 2 for the smooth start of the vehicle.

Figure 3:
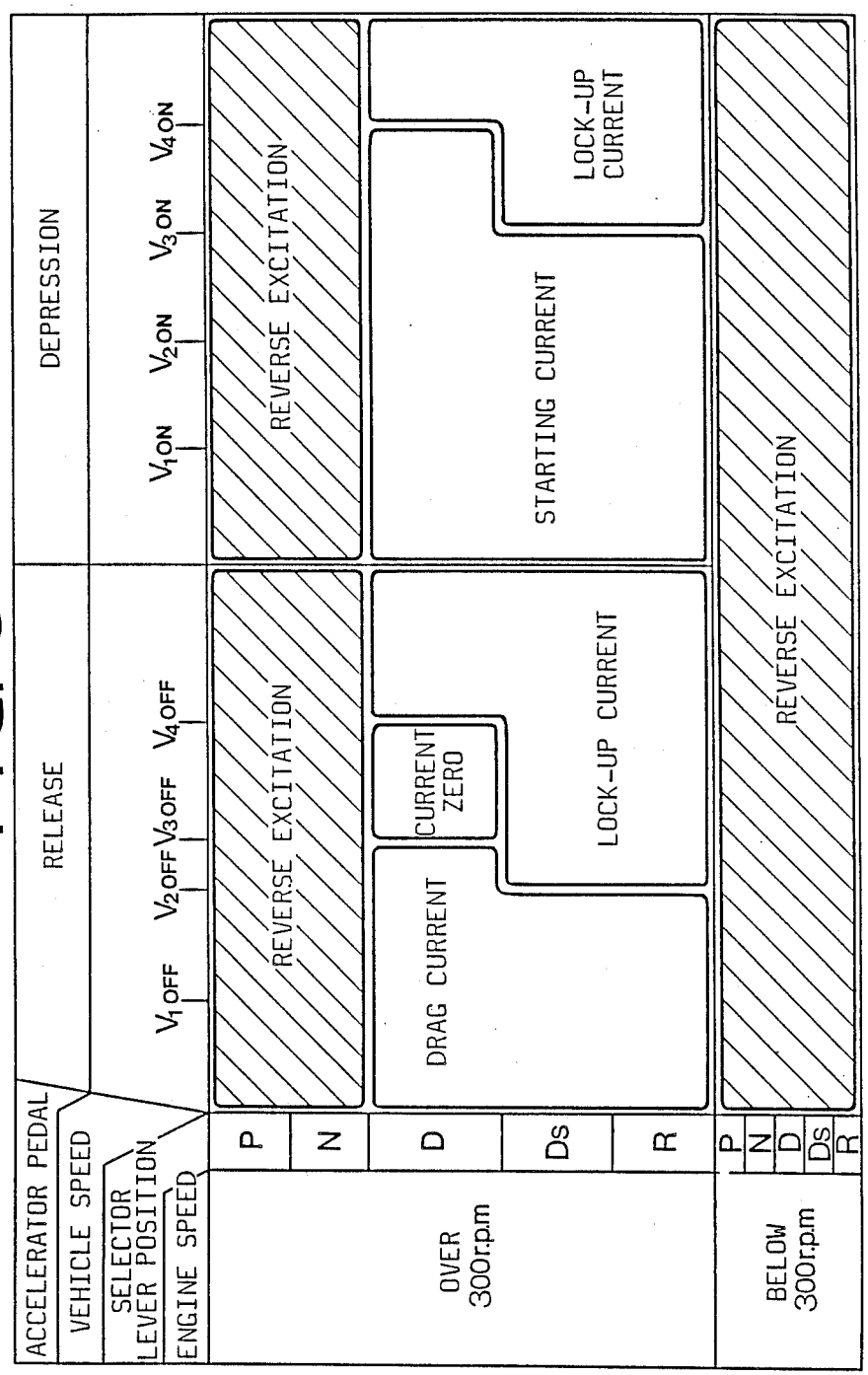
FIG. 3 is a graph showing regions of various modes.

The clutch lock-up engage mode providing section 37 decides a lock-up current in response to the vehicle speed V and throttle opening degree $\theta$ at each drive position for entirely engaging the clutch 2. Outputs of sections 35, 36 and 37 are applied to the output deciding section 33 to control the clutch current. A range of each mode is shown in FIG. 3.

In addition, a clutch engagement rate calculator 38 is further provided in the control unit 20 for transient state modes. At the clutch engagement ratio calculator 38, which is applied with the engine speed Ne and a driven member speed Nc of the sensor 18, the calculation of engagement ratio E is made by E=Nc/Ne. When E=1, the clutch is locked-up. When the ratio E is smaller than 1 (E<1), it means that the engine speed Ne is faster than the driven member speed Nc (Ne>Nc), slipping the clutch. In other words, the system is in a mode that the engine drives the vehicle (vehicle drive mode). On the other hand, when the ratio E is larger than 1 (E>1), the engine speed Ne is smaller than the driven member speed Nc (Ne<Nc), which means that the torque is transmitted from wheels of the vehicle to the engine. In other words, the system is in a mode that the vehicle drives the engine (engine drive mode). Thus, the clutch is also in slipping state.

The output signal of the clutch current mode deciding section 34, signals Nc, R, D, Ds and $\theta$ are applied to a transient mode current providing section 39 which operates to produce a clutch current signal. The transient mode current providing section 39 is further applied with the engagement ratio signal E for providing an appropriate clutch current so that the actual engagement ratio E coincides with a desired engagement ratio Eo.

Figure 4A:
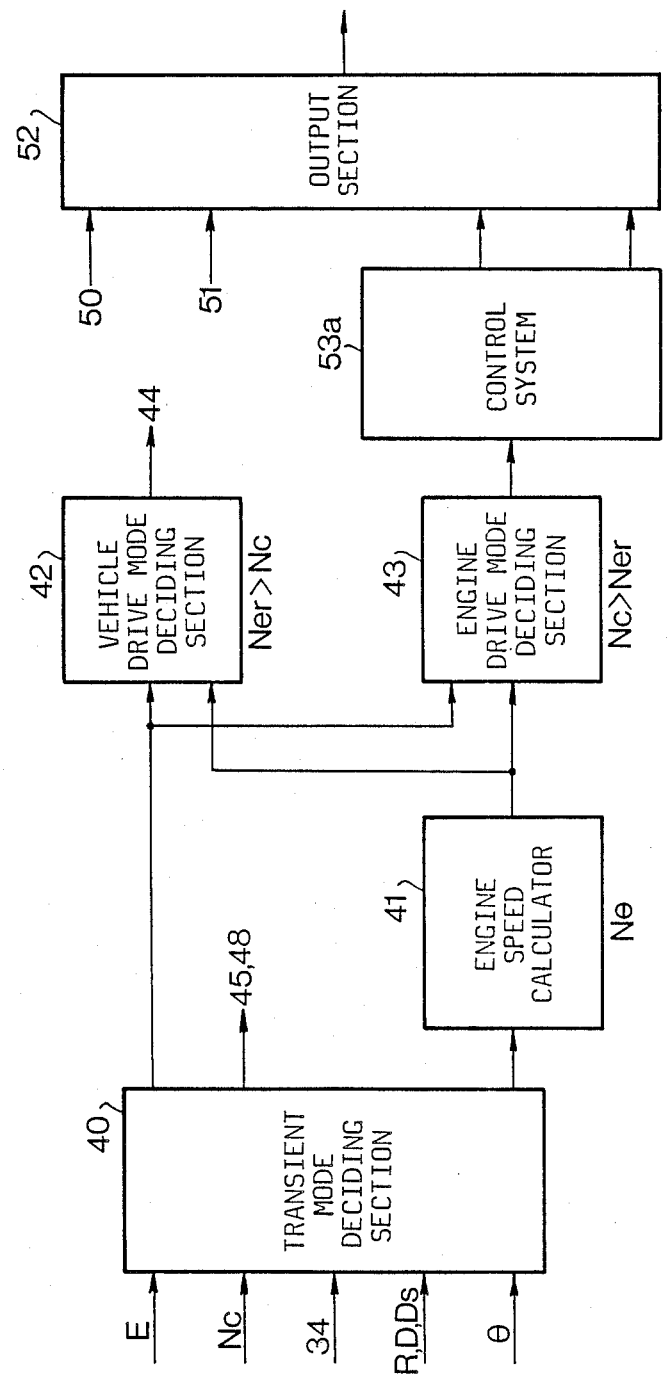
FIGS. 4a and 4b are block diagrams of a main part of the system according to the present invention.
Figure 4B:
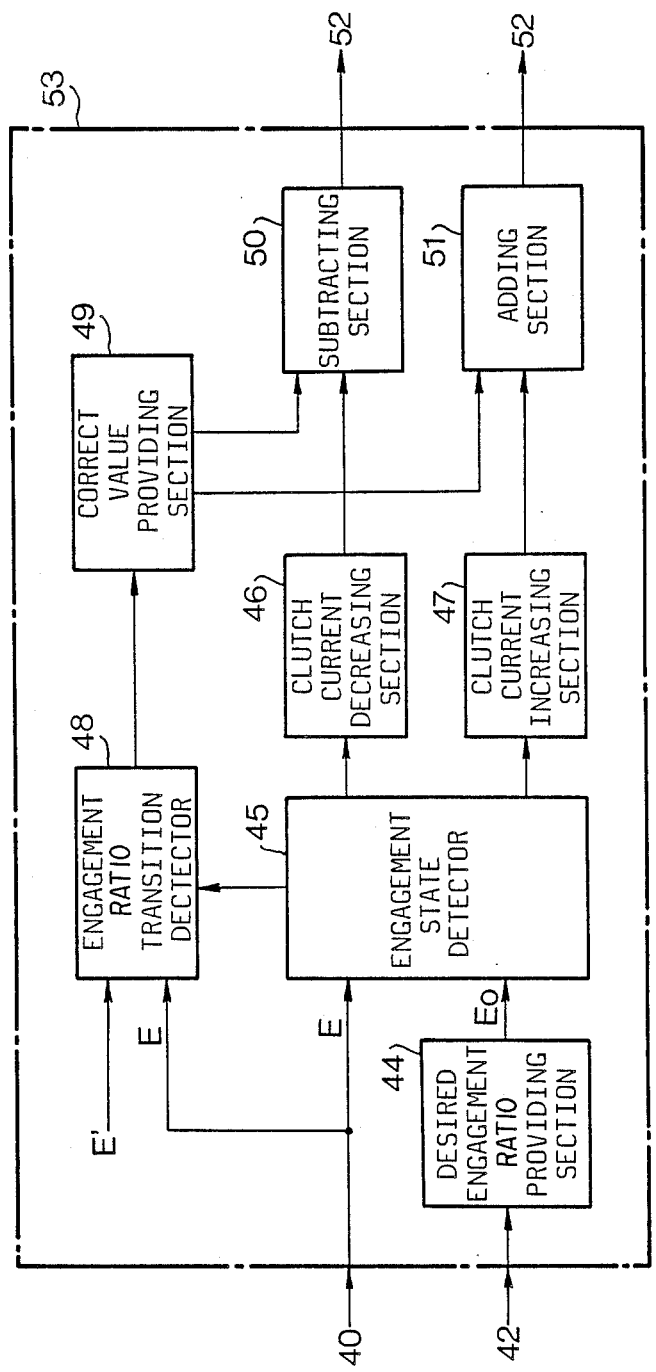

Referring to FIGS. 4a and 4b, showing the transient mode current providing section 39 the section 39 has a transient mode deciding section 40 which is applied with the output signal of the section 34, and signals Nc, E, $\theta$, R, D, and Ds. An engine speed calculator 41 is provided for calculating a reference comparative engine speed Ner based on the throttle position signal $\theta$ at the release of the clutch. The engine speed signal Ner and the driven member speed signal Nc are applied to a vehicle drive mode deciding section 42 and an engine drive mode deciding section 43, respectively. When the engine speed Ner is larger than the driven member speed Nc (Ner>Nc), the vehicle drive mode is determined at the section 42. If the Ner is smaller than the Nc (Ner<Nc), the engine drive mode is determined at the section 43.

Output signals of the sections 42 and 43 are applied to respective feedback control systems 53, 53the. In a feedback control system 53 for the vehicle drive mode, a desired clutch engagement ratio calculator 44 produces a desired engagement ratio Eo (Eo≦1). The desired engagement ratio Eo is set so as to provide an optimum slipping of the clutch in accordance with the particular transient state mode, elapsed time after the start of the transient mode, and driving conditions. The actual engagement ratio E and the desired engagement ratio Eo are applied to an clutch engagement state detector 45 for comparing the E with the Eo. When the actual engagement ratio E is larger than the desired engagement ratio Eo (E>Eo), an output signal is applied to a clutch current decreasing section 46 which produces a current decreasing signal ($-K(E-Eo)$) in accordance with the difference, where K is a constant. When the actual engagement ratio E is smaller than the desired engagement ratio Eo (E<Eo), the output signal is applied to a clutch current increasing section 47 which produces a current increasing signal ($K(Eo-E)$).

Further, the output signal of the engagement state detector 45 is applied to a clutch engagement ratio transition detector 48 which is applied with the actual engagement ratio E and the last engagement rate E'. The clutch engagement ratio transition detector 48 is provided for detecting the inverse transition of the actual engagement ratio. The inverse transition is determined in the case when the actual engagement ratio E becomes larger than the last engagement ratio E' in spite of the condition that the clutch torque must be reduced in accordance with the current decreasing signal dependent on E>Eo, or in the case when the engagement ratio E becomes smaller than the last engagement ratio E' (the engagement ratio E is decreasing) in spite of the condition that the clutch torque must be increased by the current increasing signal in accordance with the condition E<Eo. The clutch engagement ratio transition detector 48 produces a correct signal which is applied to a correct value providing section 49. The correct value providing section 49 sets a correct current Ic' which is a constant or, a value in proportion to the absolute value of the deviation ($|Eo-E|$), or a value relative to changing rate of engagement ratio ($dE/dt$). Outputs of the clutch current decreasing section 46 and the correct value providing section 49 are applied to a subtracting section 50 for obtaining a current $-K(E-Eo)-Ic'$ so as to further reduce the clutch current. Further, outputs of the clutch current increasing section 47 and the section 49 are applied to an adding section 51 for obtaining a current $K(Eo-E)+Ic'$. Thus, the clutch current is corrected and produced through an output section 52.

The feedback control system 53a for the engine drive mode is the same in construction as that of the system 53. However, desired engagement ratio Eo is equal to or larger than one (Eo≧1). Accordingly, increase and decrease operations in accordance with comparison between the actual engagement ratio E and the desired engagement ratio Eo are in reverse of the vehicle drive mode.

The operation of the control system is described hereinafter. At the starting of the vehicle, when the accelerator pedal is depressed while the select lever 25 is positioned at D-range, the start mode providing section 35 is selected. Accordingly, the clutch torque increases with clutch current in proportion to the engine speed. When the vehicle speed reaches a clutch engaging speed $V_4$ shown in FIG. 3, the lock-up engage mode providing section 37 is selected to lock-up the clutch.

The operation of the control system in the transient state mode when the position of the selector lever 25 is shifted from the D-range of the Ds-range during the lock-up engagement of the clutch, is described hereinafter with reference to a flowchart in FIG. 5 and a graph in FIG. 6.

At the shifting of the D-range to the Ds-range, the transient state mode from D-range to Ds-range is detected by the transient mode deciding section 40. The engine speed Ner at the throttle position $\theta$ at the release of the clutch is derived from the engine speed calculator 41. When the Ner is larger than the driven member speed Nc (Ner>Nc), the desired engagement ratio Eo is set as shown by the dotted line in FIG. 6. The desired engagement ratio Eo for the detected transient state is set so as to temporarily increase the slipping of the clutch in order to absorb the shock which occurs when the power of the engine suddenly increases at the Ds-range, and to gradually decrease the slipping until the clutch is locked-up again.

When the desired engagement ratio Eo rapidly decreases in the initial period, the actual ratio E becomes larger than the desired ratio Eo. The decreasing current $-K(E-Eo)$ is derived from the clutch current decreasing section 46, so that the clutch current Ic is reduced by $-K(E-Eo)$ to increase the slipping. On the other hand, the detector 48 detects the inverse transition of the engagement ratio during the decrease of clutch torque.

If the engagement ratio does not decrease (E>E') in spite of Eo<E, the correct current Ic' derived from the correct value providing section 49 is further subtracted from $-K(E-Eo)$ at the subtracting section 50 to improve the response of the actual ratio E to the desired rate Eo.

The actual engagement ratio E reaches to the desired ratio Eo, and at last, the actual ratio E becomes smaller than the desired ratio Eo. Therefore, the clutch current Ic is increased by the increasing current $K(Eo-E)$ derived from the clutch current increasing section 47 to decrease the slipping. If the engagement ratio E does not increase (E<E') in spite of Eo>E, the increasing current is corrected by adding the correct current Ic'.

The operation is repeated to vary the actual engagement ratio E in response to the desired engagement ratio Eo.

Figure 5:
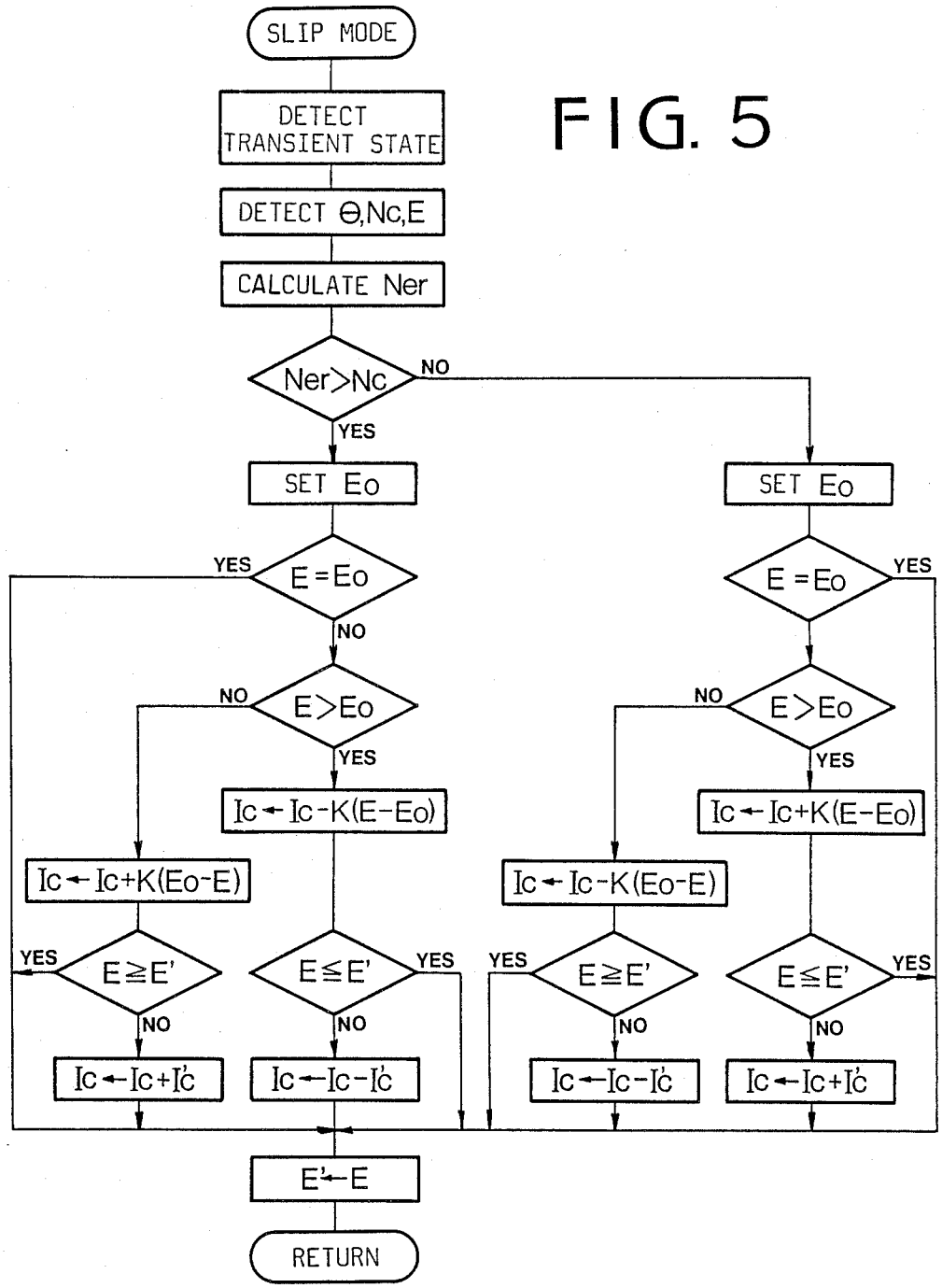
FIG. 5 is a flow chart showing the operation of the system.
Figure 6:
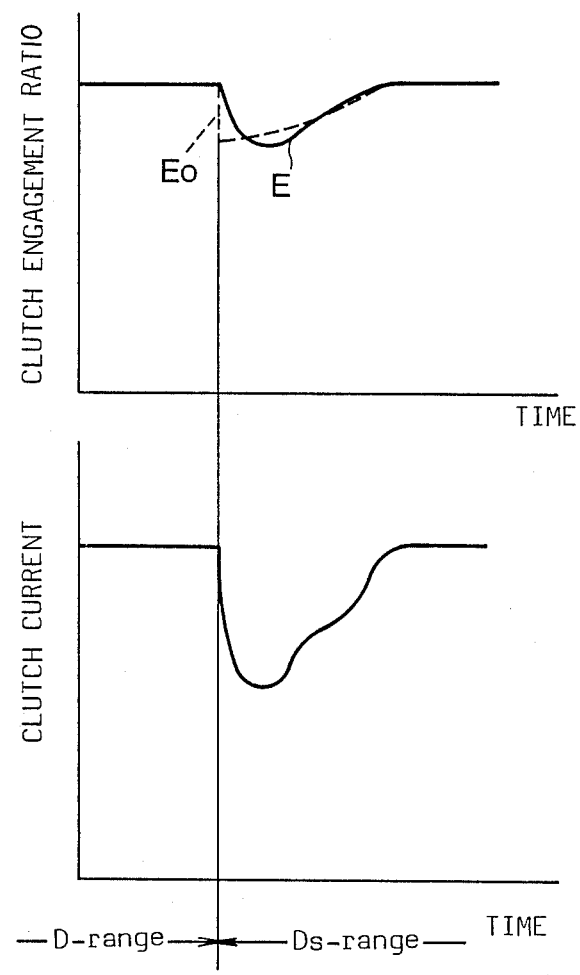
FIG. 6 is a graph showing characteristics of clutch engagement ratios.

The control system for the engine drive mode is similarly operated as shown in FIG. 5.

It is understood that the clutch is controlled in a similar manner in other transient state modes, and that the present invention may be applied to other automatic clutches besides electromagnetic clutch.

According to the present invention, the clutch torque is controlled in the transient state modes by the feedback control in accordance with the engagement ratio of the clutch. Accordingly, the clutch is controlled with an appropriate slipping characteristic being provided. The control system detects the difference between the actual engagement ratio and the desired engagement ratio of the clutch and the inverse transition of the engagement ratio for correcting the clutch current. Therefore, the response to and the convergence on the variation of clutch engagement ratio characteristic during the increase or decrease of the clutch torque are improved.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a system for controlling a clutch mounted on a motor vehicle, the clutch selectively transmitting power of an engine to a transmission, the system comprising an engine speed sensor producing an engine speed signal dependent on rotational speed of the engine, a driven member speed sensor producing a driven member speed signal dependent on rotational speed of an output member of the clutch, a select position sensor producing a select position signal dependent on a select position of the transmission, a throttle position sensor producing a throttle position signal dependent on opening degree of a throttle valve of the engine, and a vehicle speed sensor producing a vehicle speed signal responsive to output speed of the transmission, the improvement of the system which comprises, reverse excitation mode deciding means responsive to the engine speed signal and select position signal for producing a reverse excitation signal to supply a small reverse current to the clutch to completely release the clutch, clutch engagement ration calculating means responsive to the engine speed signal and driven member speed signal for producing an actual engagement ratio signal representative of a lock-up mode, vehicle drive mode and engine drive mode, clutch current mode deciding means responsive to said actual engagement ratio signal of the clutch engagement ratio calculating means for producing an actual mode signal, transient mode deciding means responsive to the output signals of the clutch current mode deciding means, driven member speed sensor, select position sensing means, and throttle position sensor, for deciding a transient mode of the clutch, drive mode deciding means during said transient mode being responsive to a comparative signal representing an engine speed and said driven member speed signal for producing a drive mode signal, desired clutch engagement ratio providing means responsive to the drive mode signal for producing a desired engagement ratio signal, engagement state detecting means for comparing the desired engagement ratio signal with the actual engagement ratio signal for producing a current condition signal, engagement ratio transition detecting means responsive to the actual engagement ratio signal and a last actual engagement ratio signal dependent on the current condition signal, for detecting an inverse transition of the actual engagement ratio signal, and for producing a correct signal, slip character decision means responsive to the current condition signal and the correct signal for producing a slip condition signal to correct the clutch current, so as to provide an appropriate slip characteristic of the clutch during an increase or decrease of clutch torque, and said drive mode signal produced from said drive mode deciding means includes a vehicle drive mode signal when the engine speed signal is larger than the driven member speed signal, and an engine drive mode signal when the engine speed signal is smaller than the driven member speed signal.

2. The system according to claim 1, wherein said current signal includes a current decreasing signal when the actual engagement ratio is larger than the desired engagement ratio, and a current increasing signal when the actual engagement ratio is smaller than the desired engagement ratio.

3. The system according to claim 2, wherein said slip character decision means comprises subtracting means for subtracting the decreasing current signal from the correct signal representing a correct current, and for producing a slip increasing signal to increasing slipping of the clutch, and adding means for adding the increasing current signal and the correct signal for producing a slip decreasing signal to decrease the slipping of the clutch.

4. The system according to claim 1, further comprising an engine speed calculator responsive to a signal of said transient mode for calculating said comparative signal representing an engine speed with respect to said throttle position signal, said clutch current mode deciding means is responsive further to a signal of said reverse excitation mode deciding means.

* * * * *